US007978769B2

(12) United States Patent
Bossen

(10) Patent No.: US 7,978,769 B2
(45) Date of Patent: Jul. 12, 2011

(54) METHOD AND APPARATUS FOR CODING MOTION INFORMATION

(75) Inventor: Frank Jan Bossen, San Jose, CA (US)

(73) Assignee: NTT Docomo, Inc., Tokyo (JP)

( * ) Notice: Subject to any disclaimer, the term of this patent is extended or adjusted under 35 U.S.C. 154(b) by 2144 days.

(21) Appl. No.: 10/880,316

(22) Filed: Jun. 28, 2004

(65) Prior Publication Data

US 2004/0264573 A1    Dec. 30, 2004

Related U.S. Application Data

(60) Provisional application No. 60/533,187, filed on Dec. 29, 2003, provisional application No. 60/483,617, filed on Jun. 30, 2003.

(51) Int. Cl.
H04B 1/66 (2006.01)
H04N 7/12 (2006.01)
H04N 11/02 (2006.01)
H04N 11/04 (2006.01)

(52) U.S. Cl. .......... 375/240.16; 375/240.24; 375/240.12

(58) Field of Classification Search .............. 375/240.16
See application file for complete search history.

(56) References Cited

U.S. PATENT DOCUMENTS

| | | | | |
|---|---|---|---|---|
| 5,960,116 A | * | 9/1999 | Kajiwara | 382/238 |
| 5,990,962 A | * | 11/1999 | Ueno et al. | 375/240.16 |
| 6,160,584 A | * | 12/2000 | Yanagita | 375/240.16 |
| 6,353,683 B1 | * | 3/2002 | Horiike | 382/238 |
| 6,426,974 B2 | * | 7/2002 | Takahashi et al. | 375/240.03 |
| RE37,858 E | * | 9/2002 | Murakami et al. | 382/233 |
| 6,498,810 B1 | | 12/2002 | Kim et al. | |
| 2004/0190618 A1 | * | 9/2004 | Ota et al. | 375/240.16 |
| 2006/0109149 A1 | * | 5/2006 | Sekiguchi et al. | 341/50 |

FOREIGN PATENT DOCUMENTS

| | | |
|---|---|---|
| EP | 0 272 505 A2 | 6/1988 |
| JP | 11-313211 | 11/1999 |
| JP | 11-313212 | 11/1999 |
| WO | WO9814010 * | 2/1998 |
| WO | WO 98/14010 | 4/1998 |

OTHER PUBLICATIONS

Sung Deuk Kim and Jong Beom Ra, An Efficient Motion Vector Coding Scheme Based on Minimum Bitrate Prediction, Aug. 8, 1999, IEEE Transactions on Image Processing, vol. 8 No. 8 p. 1117-1119.*
Sung Deuk Kim et al., "An Efficient Motion Vector Coding Scheme Based on Minimum Bitrate Prediction," IEEE Transactions on Image Processing, Aug. 1999, pp. 1117-1120, vol. 8, No. 8, IEEE, New York, U.S.A.

(Continued)

*Primary Examiner* — Jayanti K Patel
*Assistant Examiner* — Jessica Prince
(74) *Attorney, Agent, or Firm* — Blakely, Sokoloff, Taylor & Zafman LLP

(57) ABSTRACT

Video compression algorithms typically represent visual information by a combination of motion and texture data. Motion data describes the temporal relationship between the content of a frame and that of a previous frame. This invention describes a method and apparatus for efficiently encoding motion data, particularly in the presence of horizontal and/or vertical motion boundaries.

56 Claims, 13 Drawing Sheets

OTHER PUBLICATIONS

Slaven Marusic et al., "A Study of Two New Adaptive Predictors for Lossless Image Compression," Image Processing, Oct. 26, 1997, pp. 286-289, XP010253902, IEEE Comput. Soc, Los Alamitos, CA, U.S.A.

K.A. Prabhu, "A Predictor Switching Scheme for DPCM Coding of Video Signals," IEEE Transactions on Communications, Apr. 1985, pp. 373-379, vol. Com-33, No. 4, IEEE.

Nasir Memon et al., "Recent Developments in Context-Based Predictive Techniques for Lossless Image Compression," The Computer Journal, 1997, pp. 128-136, vol. 40, No. 2/3, Oxford University Press, Surrey, Great Britain.

Markus Flierl et al., "Multihypothesis Motion-Compensated Prediction with Forward-Adaptive Hypothesis Switching," Proceedings of Picture Coding Symposium PCS, 2001, pp. 1-4, XP-002301636, Seoul, Korea.

Invitation to Pay Additional Fees, Nov. 12, 2004, 5 pages.

Notification Of Transmittal Of The International Search Report And The Written Opinion Of The International Searching Authority, Or The Declaration mailed May 2, 2005, 20 pages.

Japanese Office Action for corresponding Japanese Patent Application No. 2006-517831, Jun. 8, 2010, 5 pgs. *English Translation Provided*.

* cited by examiner

METHOD AND APPARATUS FOR CODING MOTION INFORMATION

PRIORITY

The present patent application claims priority to the corresponding provisional patent application Ser. No. 60/533,187, titled, "Method And Apparatus For Coding Motion Information" filed on Dec. 29, 2003 and provisional patent application Ser. No. 60/483,617, titled, "Method and Apparatus for Coding Motion Information" filed on Jan. 30, 2003, assigned to the assignee of the present invention and incorporated herein by reference.

FIELD OF THE INVENTION

The present invention relates to the field of coding information; more particularly, the present invention relates to coding of information such as, for example, motion vectors using multiple predictions.

BACKGROUND OF THE INVENTION

Video compression algorithms typically represent visual information by a combination of motion data and texture data. The motion data describes the temporal relationship between the content of a frame and that of a previous frame. Motion data is typically represented by a set of motion vectors associated with blocks that define a partition of a frame. For each block, a motion vector describes the horizontal and vertical displacement with respect to a previous frame. The correlation between motion vectors belonging to adjacent blocks is typically high, and therefore differential coding methods are typically employed to code motion vectors.

Motion vectors are differentially coded with respect to a single prediction. This single prediction may be obtained by combining several motion vectors, for example by using a median operator (see ISO/IEC 14496-2 (1999) and ISO/IEC 14496-10 (2003)). Alternatively, the prediction may be obtained by referring to a single motion vector (see ISO/IEC 13818-2).

Related art solutions can be inefficient in some cases, where efficiency is defined by the number of bits required to code a set of motion vectors. For example, when a median operator is used as in ISO/IEC 14496-2 in the presence of a horizontal motion boundary, a same non-zero difference will be encoded multiple times even though a zero difference could be encoded with respect to a locally available motion vector (e.g., the motion vector to the left).

Consider two rows of motion vectors. The motion vectors in the top row all have value A and the ones in the bottom row value B:

AAAAAAAA
BBBBBBBB

When encoding the bottom row of motion vectors, the prediction generated by the median operator will always have value A. Therefore, the difference between the values A and B will be encoded multiple times. It is preferable to have a coding method that encodes mostly zero value differences for the bottom row.

The prediction method in ISO/IEC 13818-2 works well with the pattern described above in that it generates zero differences. However, the prediction is inefficient in the presence of a vertical motion field boundary, as the prediction always refers to the block to the left. An example of a vertical motion boundary is described below:

AB
AB
AB
AB

A motion vector prediction and coding method is thus sought that efficiently encodes motion vectors in the presence of either or both horizontal and vertical motion boundaries.

SUMMARY OF THE INVENTION

A method and apparatus is disclosed herein for encoding and decoding information (e.g., motion vectors) using multiple predictions. In one embodiment, the method comprises computing multiple of predictions from multiple previously coded data elements, computing a context based on another group of previously coded data elements, selecting one of the plurality of predictions to obtain a selected prediction, encoding an indication of the selected prediction using the context and encoding a data element difference between the selected prediction and the data element.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
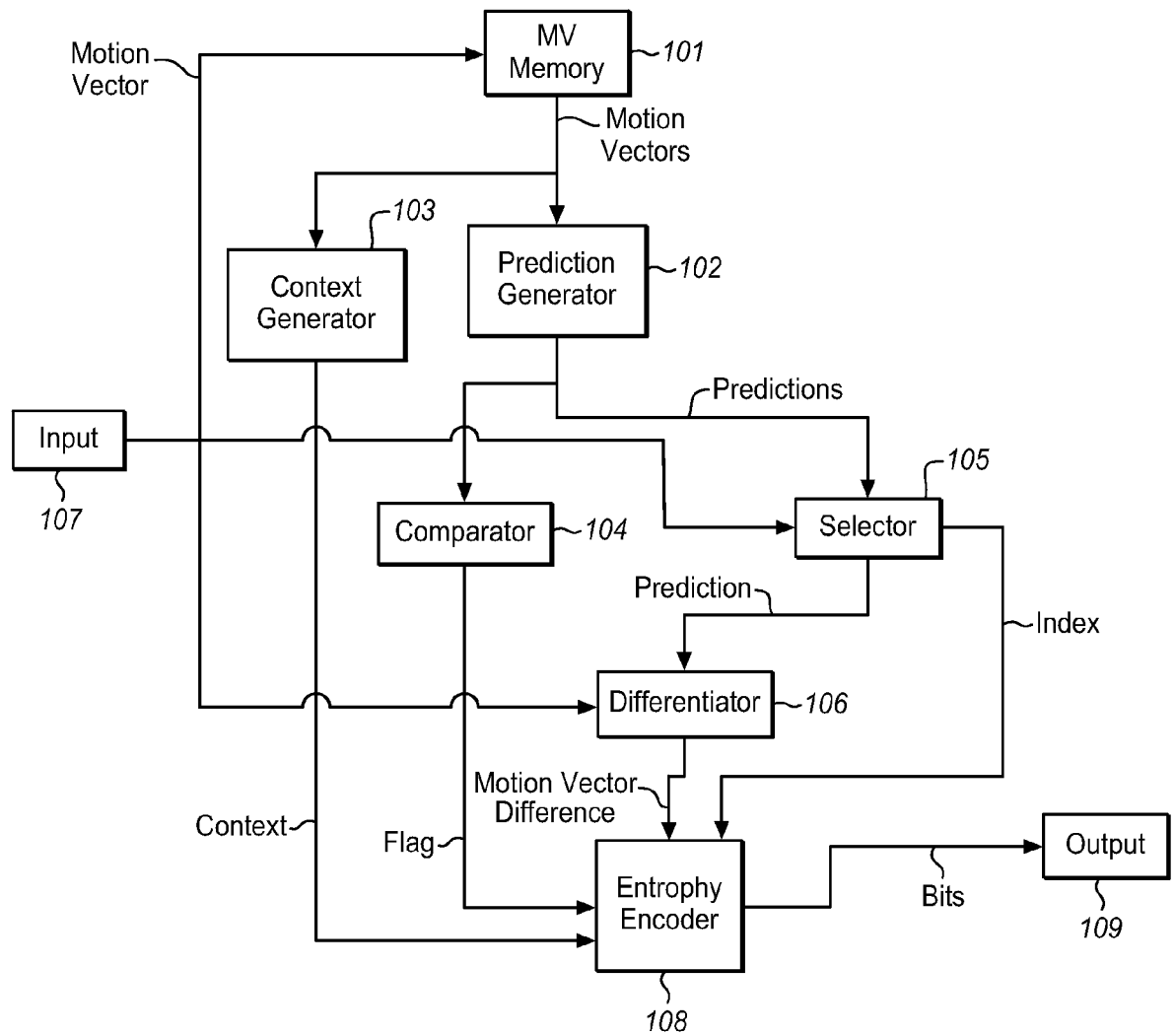
FIG. 1 is a block diagram of one embodiment of an exemplary encoding system.

A method and apparatus for coding information is described. In one embodiment, the information comprises data elements (e.g., motion vectors). In one embodiment, differential coding of motion vectors is performed using multiple predictions. An encoder that encodes the motion vectors selects one of the predictions and sends information describing its choice to a decoder that can reconstruct the proper prediction. The choice between multiple predictions enables the efficient encoding of motion data (e.g., a reduction of the number of bits required to code motion vectors) in the presence of horizontal and/or vertical motion boundaries. A reduction of the number of bits needed for coding motion data allows more bits to encode texture data. These additional bits can be used to increase the visual quality of compressed images.

A conditioning technique may be used to predict the most likely choice for each block such as to reduce the cost of coding the choices. In one embodiment, the conditioning technique is implemented using a context generator that selects one of several entropy models based on local gradients, thereby reducing the cost of coding an indication (e.g., index) representing a selected motion vector prediction.

Extensions are described to improve coding efficiency in the presence of motion boundaries with arbitrary orientations.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, or magnetic or optical cards, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Encoding and Decoding

In one embodiment, an image may be partitioned into a set of fixed-size blocks. These blocks may be any size (e.g., 4×4, 8×8, 16×16 pixels). Although the following description is described in terms of fixed-size blocks, the techniques described herein may be used with blocks of variable size.

Each block may have a motion vector associated with it. Blocks may be scanned in a raster-scan order. For each block that has a motion vector associated with it, a motion vector is generated (e.g., using a motion estimation algorithm) and input to an encoding system, such as, for example, the encoding system shown in FIG. 1. Whereas the above descriptions refer to the coding of motion vector data, the same principles are applicable to the coding of other data, such as, for example, DC values in an image to which a transform, such as a DCT, has been applied.

Referring to FIG. 1, all or part of the encoding system in FIG. 1 may comprise hardware (circuitry, dedicated logic, etc.), software (such as is run on a general purpose computer system or a dedicated machine), or a combination of both.

The motion vector is stored into a motion vector (MV) memory 101 for future reference. Alternatively, all motion vectors may initially be stored in memory 101 via, for example, input 107, and included motion vectors may be extracted from memory 101.

Figure 5:
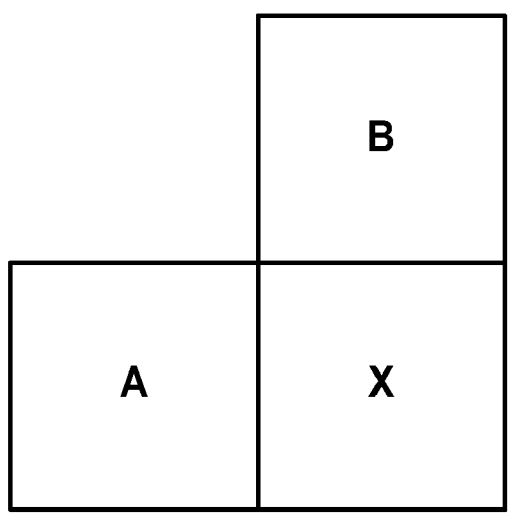
FIG. 5 illustrates neighboring blocks containing motion vectors that may be used in one embodiment for generating predictions for a block containing a motion vector to be coded.
Figure 12:
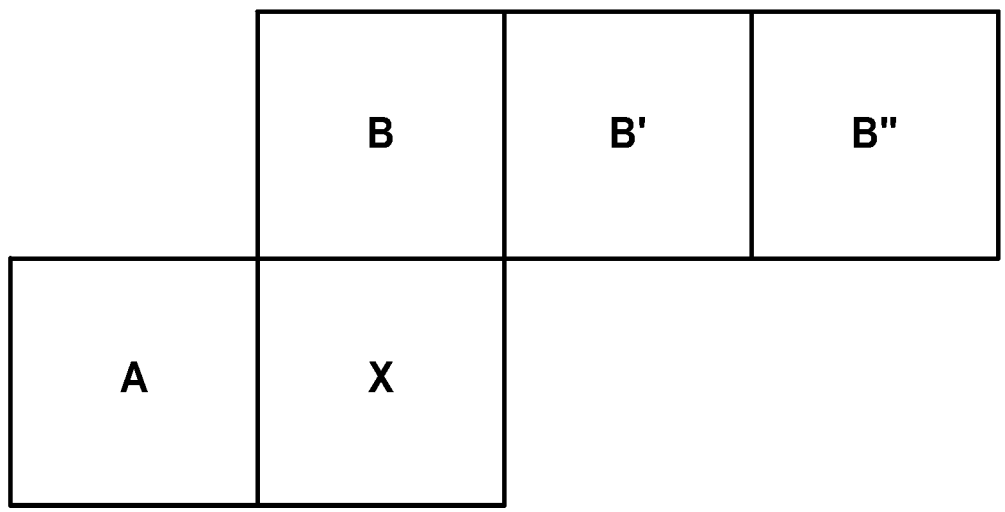
FIG. 12 illustrates additional neighbors that may be used for prediction.

Previously coded motion vectors are extracted from motion vector memory 101 by a prediction generator 102. For example, prediction generator 102 may extract the motion vectors associated with the blocks that lie to the left and to the top of the block to which the motion vector to be coded is associated with. FIG. 5 describes the relationship between a block X containing a motion vector to be coded, and block A (left) and B (top) that contain motion vectors stored in the motion vector memory. Alternatively, other neighboring blocks may be used such as those shown, for example, in FIG. 12 where additional neighboring blocks B' and B" are used.

In one embodiment, if motion vectors belonging to N blocks are used to generate predictions, prediction generator 102 many generate N predictions, one for each block. In an alternative embodiment, prediction generator 102 may generate less than N predictions when using motion vectors belonging to N blocks to generate predictions. Alternatively, prediction generator 102 may generate only two predictions.

For example, a first prediction may correspond to the motion vector of A and a second prediction may correspond to the motion vector of B.

Prediction generator 102 generates two or more motion vector predictions. These predictions may be the motion vectors extracted from memory 101 or an arithmetic combination thereof. For example, arithmetic combinations that may be used include the average of two vectors or the computation of the median value between three or more vectors.

Comparator 104 compares the motion vector predictions and determines whether all of the predictions are equal. The result of the comparison is transmitted to entropy encoder 108.

Selector 105 selects one of the motion vector predictions. For example, selector 105 may select the prediction that minimizes (or reduces) the difference (e.g., L1 norm) with respect to the motion vector to be coded given by input 107. The selected vector is a prediction that is transmitted to differentiator 106. Selector 105 also transmits an index to entropy encoder 108. The index refers to the prediction that is selected.

Differentiator 106 computes the difference between the motion vector to be coded and the prediction obtained from selector 105. The difference is transmitted to entropy encoder 108.

Figure 6:
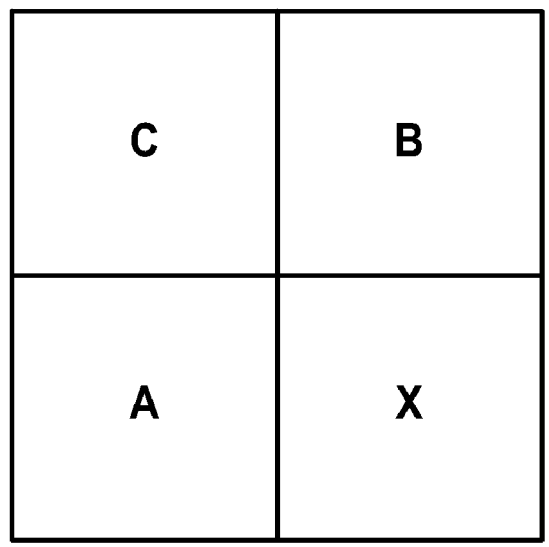
FIG. 6 illustrates a set of neighboring blocks containing motion vectors that may be used in an alternative embodiment for generating predictions for a block containing a motion vector.

Context generator 103 retrieves one or more motion vectors from motion vector memory 101 to generate a context to be used by entropy encoder 108. A purpose of context generator 103 is to analyze the motion vector data in a neighborhood of the motion vector being coded to determine which prediction is most likely to be selected by selector 105. In one embodiment, context generator 103 retrieves the motion vectors mvA, mvB, and mvC associated with blocks A, B and C depicted in FIG. 6. Context generator 103 may generate a context with a first value if |mvA−mvC| is smaller than |mvB−mvC|, and a context with a second value otherwise, where the |.| operator represents the L1 norm of a motion vector difference. Alternatively, other norms such as, for example, the L2 norm may be used.

Entropy encoder 108 converts the information received from differentiator 106, comparator 104, context generator 103, and selector 105 into zero or more bits. If the flag received from comparator 104 indicates that not all motion vector predictions are equal, entropy encoder 108 generates zero or more bits to represent the index received from selector 105. Otherwise, entropy encoder 108 doesn't generate any bits. The number of generated bits is determined by an entropy model. An entropy model may be selected based on the value of context received from the context generator 103. A first entropy model may be used if the context takes a first value, and a second entropy model may be used if the context takes a second value. Then entropy encoder 105 converts the motion vector difference received from differentiator 106 into zero or more bits. The conversion of information into bits may be performed using arithmetic coding. An example of an arithmetic coder is described in ISO/IEC 14496-10 (context-adaptive binary arithmetic coder). Other arithmetic coders may be used (see, for example, U.S. Pat. No. 4,905,297). When using an arithmetic coder, a probability estimate may be associated with each context. Alternatively, variable-length codes (e.g., Huffman codes) may be used by the entropy encoder, and a code table may be associated with each context. A single variable-length code may be used to represent a value of the index and a value of the motion vector difference.

Figure 3:
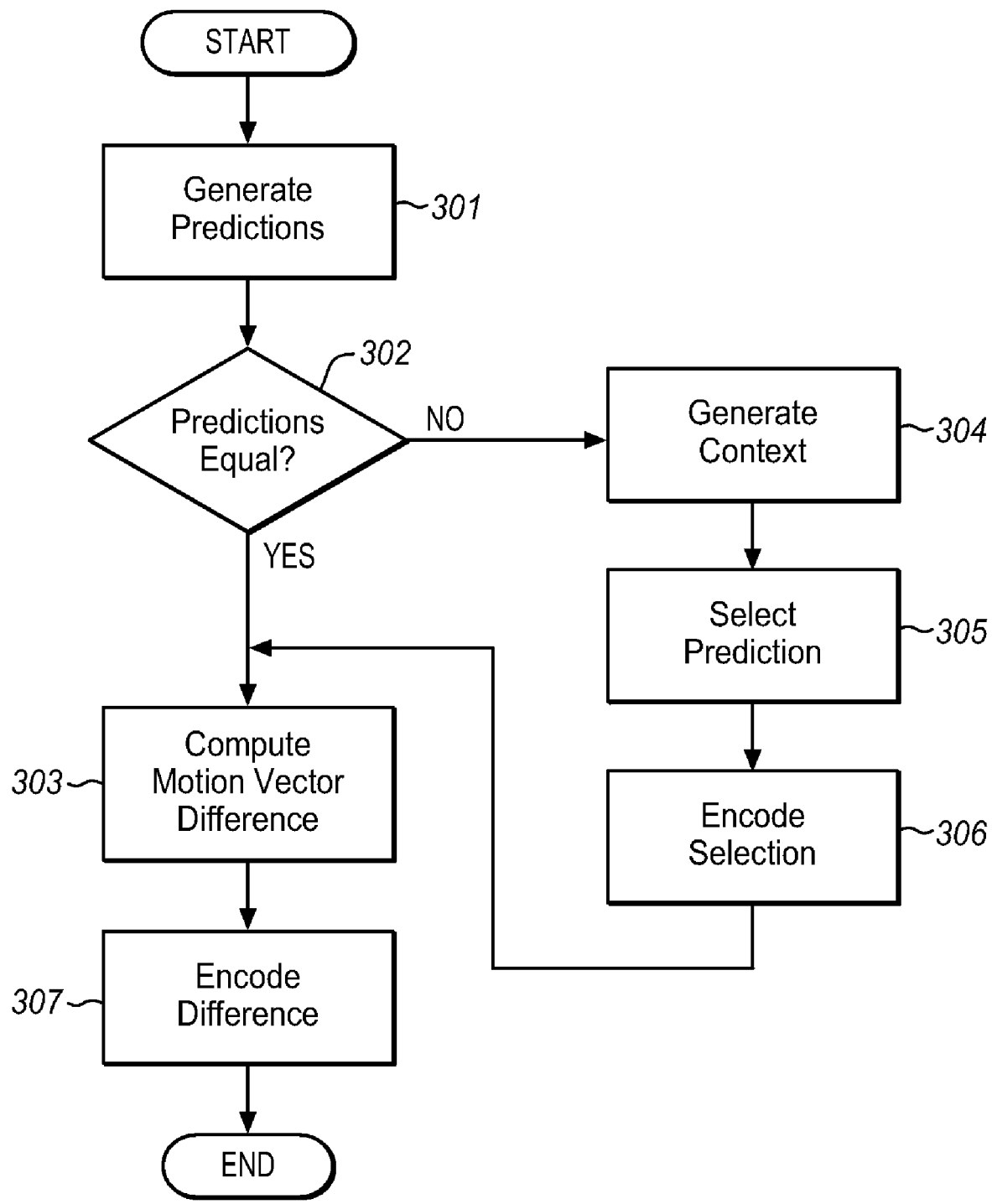
FIG. 3 is a flow diagram of one embodiment of an encoding process.

An example of an encoding process is also described in FIG. 3. The process may be performed by the encoder of FIG. 1 or other processing logic comprising hardware (circuitry, dedicated logic, etc.), software (such as is run on a general purpose computer system or a dedicated machine), or a combination of both.

Referring to FIG. 3, the process begins by processing logic generating two or more motion vector predictions from previously coded motion vectors (processing block 301). For example, two predictions may be generated equal to the motion vectors of two blocks A and B. One exemplary embodiment of the spatial relationship between the current block X and A and B is described in FIG. 5.

Then processing logic compares all predictions to each other (processing logic 302). If all predictions are equal, processing logic computes a motion vector difference (processing block 303); otherwise, processing logic generates a context by considering motion vectors of blocks in the neighborhood of the current block (processing block 304) and then selects one of the predictions, for example by selecting the one that minimizes (or reduces) the L1 norm of the difference with the motion vector to be coded (processing block 305). Next, processing logic encodes the index of the selected prediction (processing block 306). An arithmetic coder may be used for this purpose. Several entropy models may be used. The choice of an entropy model is determined by the previously computed context.

Next, the process proceeds to processing block 303 where processing logic computes a motion vector difference. In one embodiment, the motion vector difference is obtained by subtracting the selected prediction from the motion vector to be coded. Processing logic then encodes the difference using, for example, an arithmetic coder (processing block 307).

Figure 2:
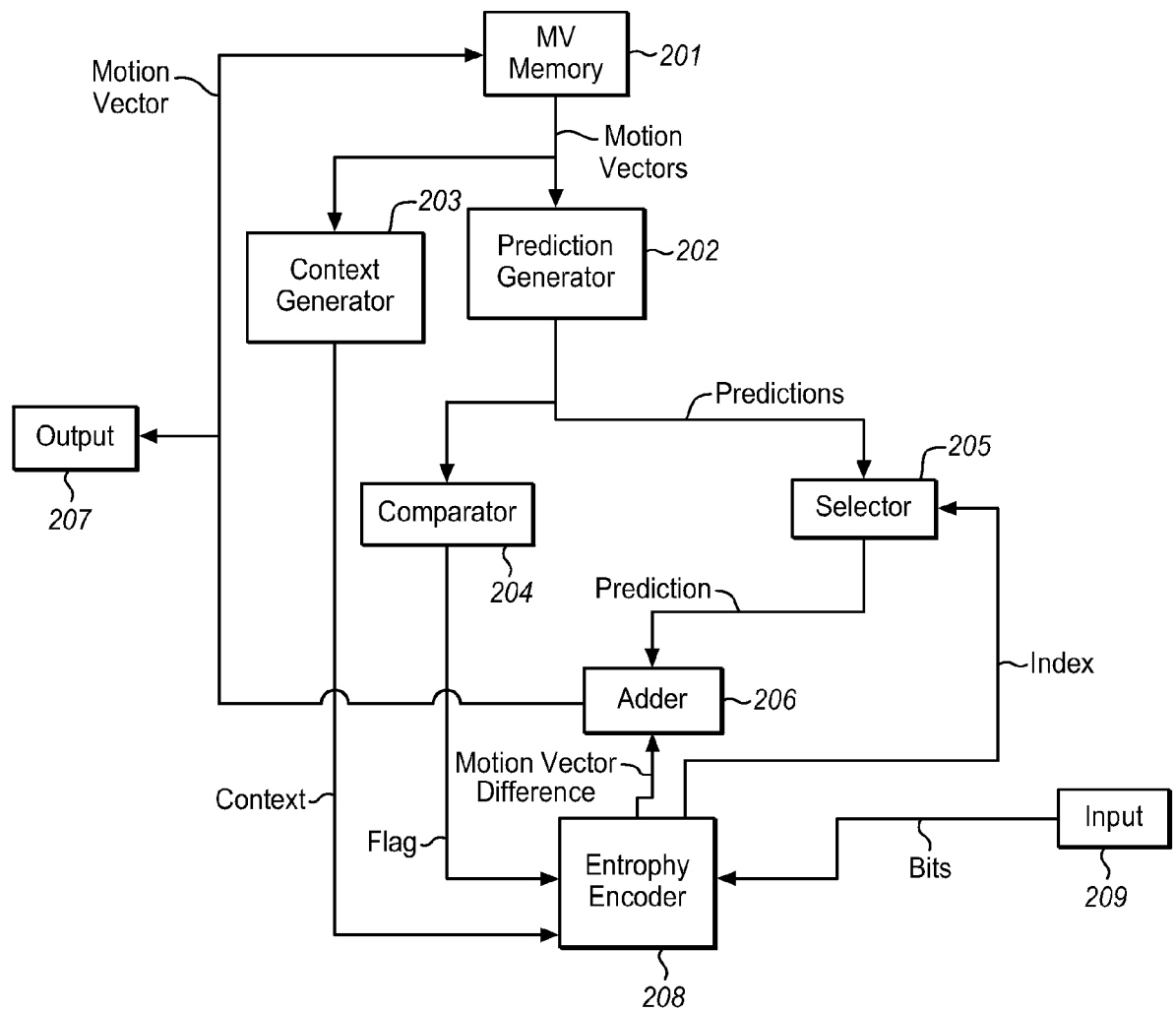
FIG. 2 is a flow diagram of one embodiment of an exemplary decoding system.

FIG. 2 is a block diagram of one embodiment of a decoder that reverses the operations of an encoder (i.e., generates a motion vector from zero or more bits). Referring to FIG. 2, prediction generator 202 extracts previously decoded motion vectors from motion vector memory 201, which stores motion vectors that will be used for prediction when decoding further motion vectors. For example, prediction generator 202 may extract the motion vectors associated with the blocks that lie to the left and to the top of the block to which the motion vector to be decoded is associated with. In response to the extracted motion vectors, prediction generator 202 generates two or more motion vector predictions. These predictions may be the motion vectors extracted from memory 101 or an arithmetic combination thereof. The motion vector prediction generation is symmetric between an encoder and a decoder.

Comparator 204 compares the motion vector predictions and determines whether all predictions are equal. Comparator 204 transmits the result of the comparison to entropy decoder 208. In one embodiment, the transmission is in the form of a flag.

Context generator 203 retrieves one or more motion vectors from motion vector memory 201 to generate a context to be used by entropy decoder 208. A purpose of context generator 203 is to analyze motion vector data in a neighborhood of the motion vector being coded to determine which prediction is most likely to be used. In one embodiment, context generator 203 retrieves the motion vectors mvA, mvB, and mvC associated with blocks A, B and C depicted in FIG. 6. Context generator 203 may generate a context with a first value if |mvA−mvC| is smaller than |mvB−mvC|, and a context with a second value otherwise, where the |.| operator represents the L1 norm of a motion vector difference.

If the flag received from comparator 204 indicates that all of the motion vector predictions are not equal, entropy decoder 208 converts zero or more bits to an index that is transmitted to selector 205. The number of converted bits is determined by an entropy model. An entropy model may be selected based on the value of the context received from context generator 203. A first entropy model may be used if the context takes a first value, and a second entropy model may be used if the context takes a second value. If the flag received from comparator 204 indicates that all of the motion vector predictions are equal, entropy decoder 208 transmits a default index without referring to any input bits.

Entropy decoder 208 further generates a motion vector difference from zero or more bits. The motion vector difference is transmitted to adder 206. The generation of information from bits may be performed using arithmetic coding. An example of an arithmetic decoder is described in ISO/IEC 14496-10. Other arithmetic decoders may be used (see, for example, U.S. Pat. No. 4,905,297). When using an arithmetic decoder, a probability estimate may be associated with each context. Alternatively, variable-length codes (e.g., Huffman codes) may be used by the entropy decoder, and a code table may be associated with each context. A single variable-length code may be used to represent a value of the index and a value of the motion vector difference. Selector 205 selects one of the motion vector predictions received according to the index received from entropy decoder 208. The selected vector is a prediction that is transmitted to adder 206.

Adder 206 computes the sum of the motion vector difference and the prediction obtained from selector 205. The result is a motion vector. Adder 206 outputs the motion vector for storage in motion vector memory 201 for future reference.

Figure 4:
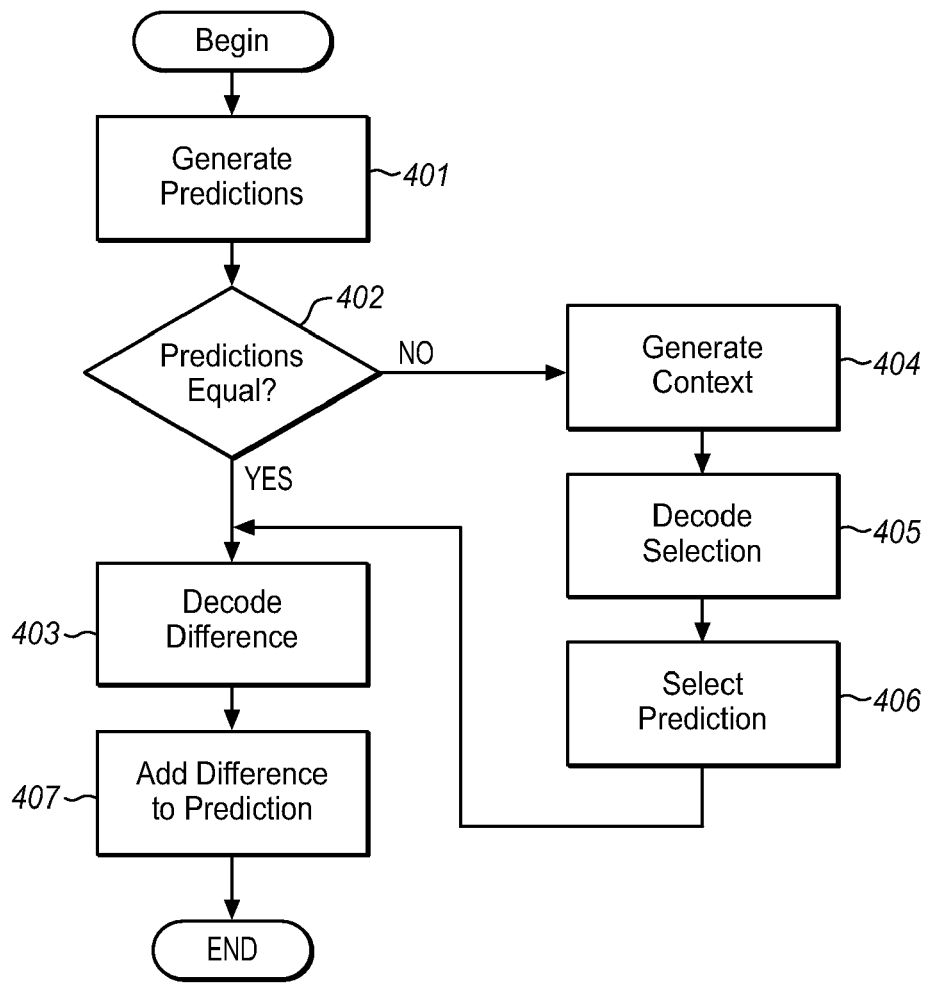
FIG. 4 is a flow diagram of one embodiment of a decoding process.

An example of a decoding process that may be performed processing logic in the decoding system of FIG. 3, or other processing logic, is described in FIG. 4. Referring to FIG. 4, the process begins by generating two or more motion vector predictions from previously decoded motion vectors (processing block 401). For example, two predictions may be generated equal to the motion vectors of two blocks A and B. The spatial relationship between the current block X and A and B is described in FIG. 5, where block X is the block being coded.

Then, processing logic compares all predictions to each other (processing logic 402). If all predictions are equal, the process proceeds to processing block 403 where processing logic decodes a motion vector difference; otherwise, processing logic generates a context by considering motion vectors of blocks in the neighborhood of the current block (processing block 404) and decodes the index of the selected prediction (processing block 405). An arithmetic decoder may be used for this purpose. Several entropy models may be used. The choice of an entropy model is determined by the previously computed context.

Afterwards, processing logic selects one of the predictions based on the decoded index (processing block 406). The process proceeds to processing block 403 where processing decodes a motion vector difference, for example, using an arithmetic decoder. Finally, process logic reconstructs a motion vector by adding the selected prediction to the decoded motion vector difference (processing block 407).

Figure 7:
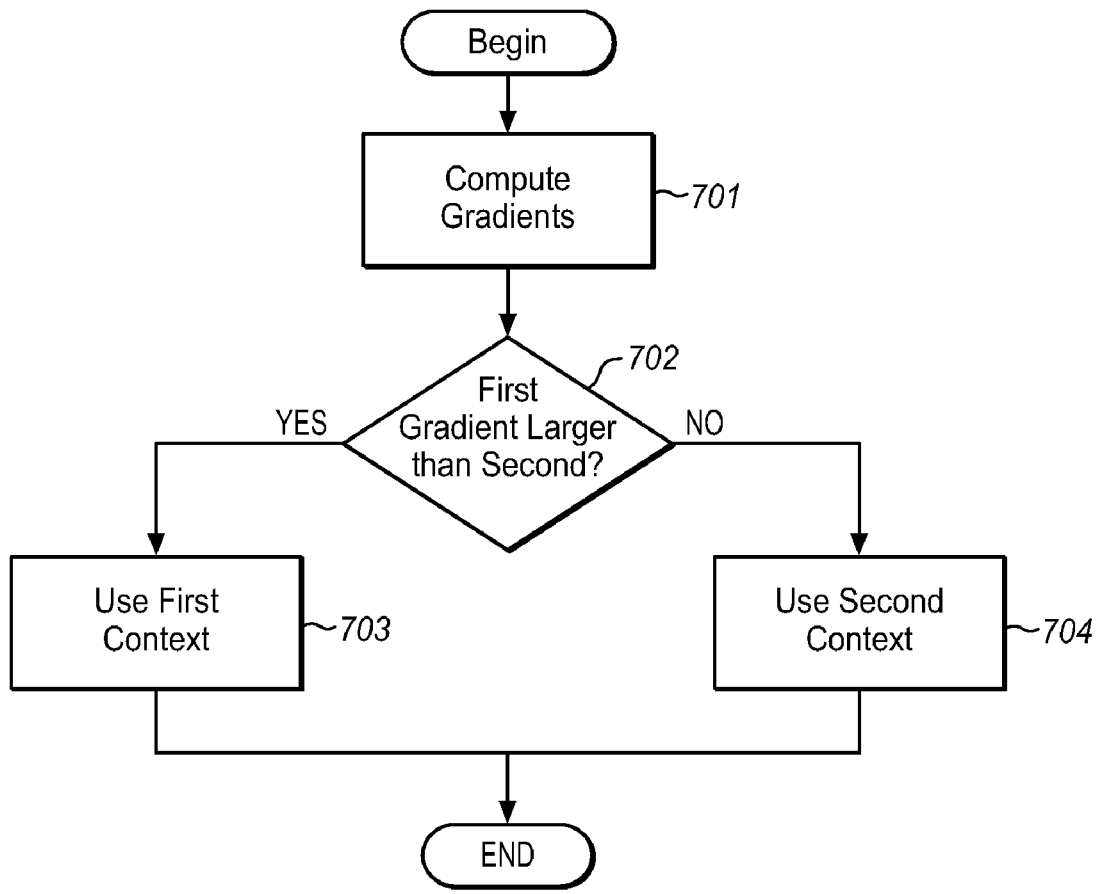
FIG. 7 is a flow diagram of one embodiment of a context generation process.

FIG. 7 is a flow diagram of one embodiment of a process for context generation. The process is performed by processing logic that may comprise hardware (circuitry, dedicated logic, etc.), software (such as is run on a general purpose computer system or a dedicated machine), or a combination of both.

Referring to FIG. 7, the process begins by processing logic computing a horizontal and a vertical gradient (processing block 701). In one embodiment, the horizontal gradient may be defined as |mvA−mvC|, where mvA is the motion vector associated with block A and mvC the motion vector associated with block C. On embodiment of the relationship between blocks A, B, C and the current block is described in FIG. 6. Similarly a vertical gradient may be defined as |mvB−mvC|.

After computing the gradient, processing logic compares the values of the two gradients (processing block 702). If the first gradient is larger than the second gradient, then processing logic uses a first context to encode an index indicating a selected prediction (processing block 703); otherwise, processing logic uses a second context to encode the index indicating the selected prediction (processing block 704).

Alternative Embodiments

With respect to context generation, instead of the context generation defining the generation of a context that may take two values as described above, the techniques described herein can be extended to generate a context that may take more than two values. For example, in one embodiment, the difference between the horizontal and the vertical gradient may be computed. Processing logic then quantizes this difference into a number of bins. The bin number corresponds to the context. For example, the context may take a first value if the difference is smaller than −2, a second value if the difference is larger than 2, and a third value otherwise. Other examples may be constructed in this way by changing the threshold values and the number of values that a context may take.

Figure 8:
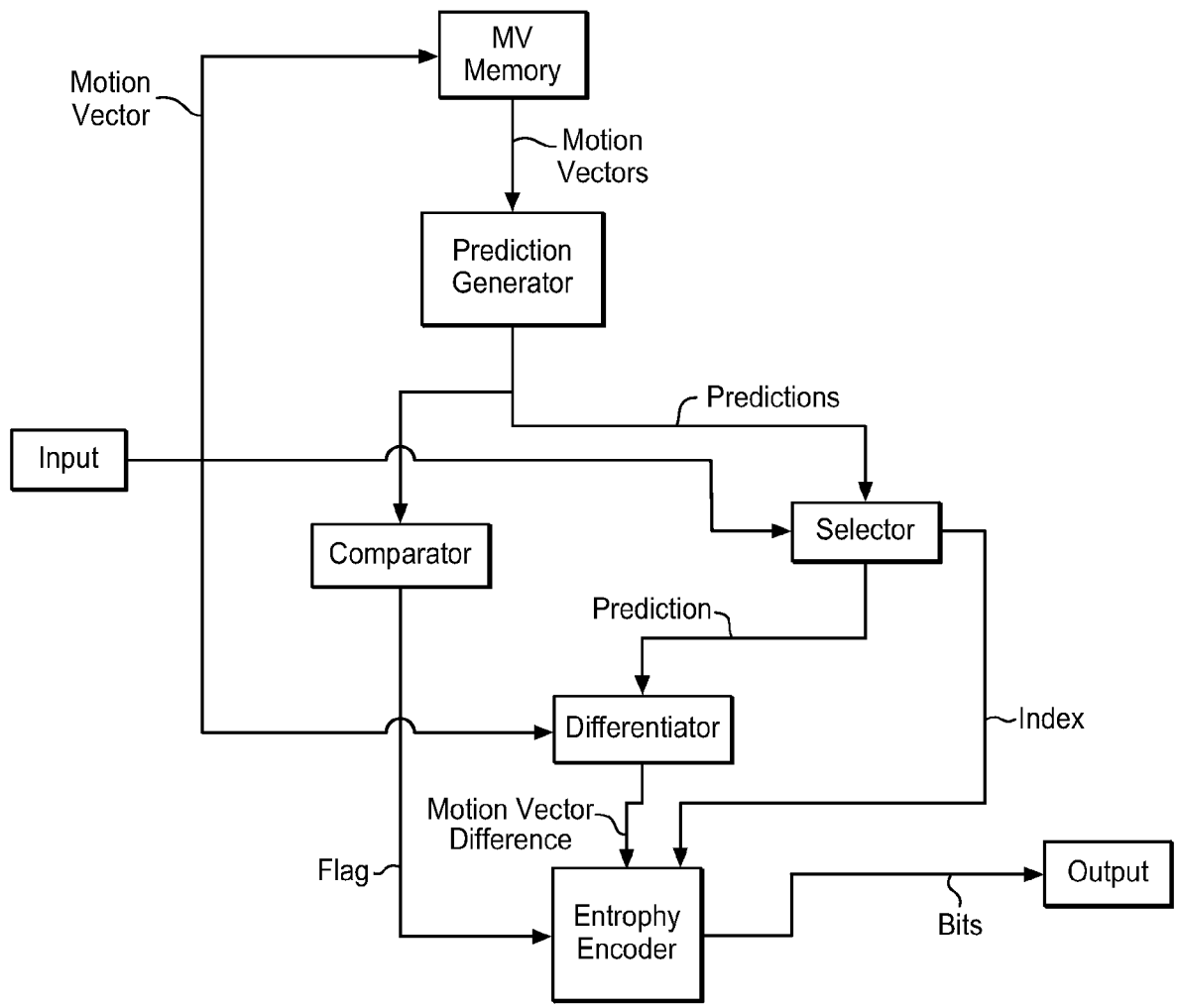
FIG. 8 is a block diagram of an alternative embodiment of an encoder.
Figure 9:
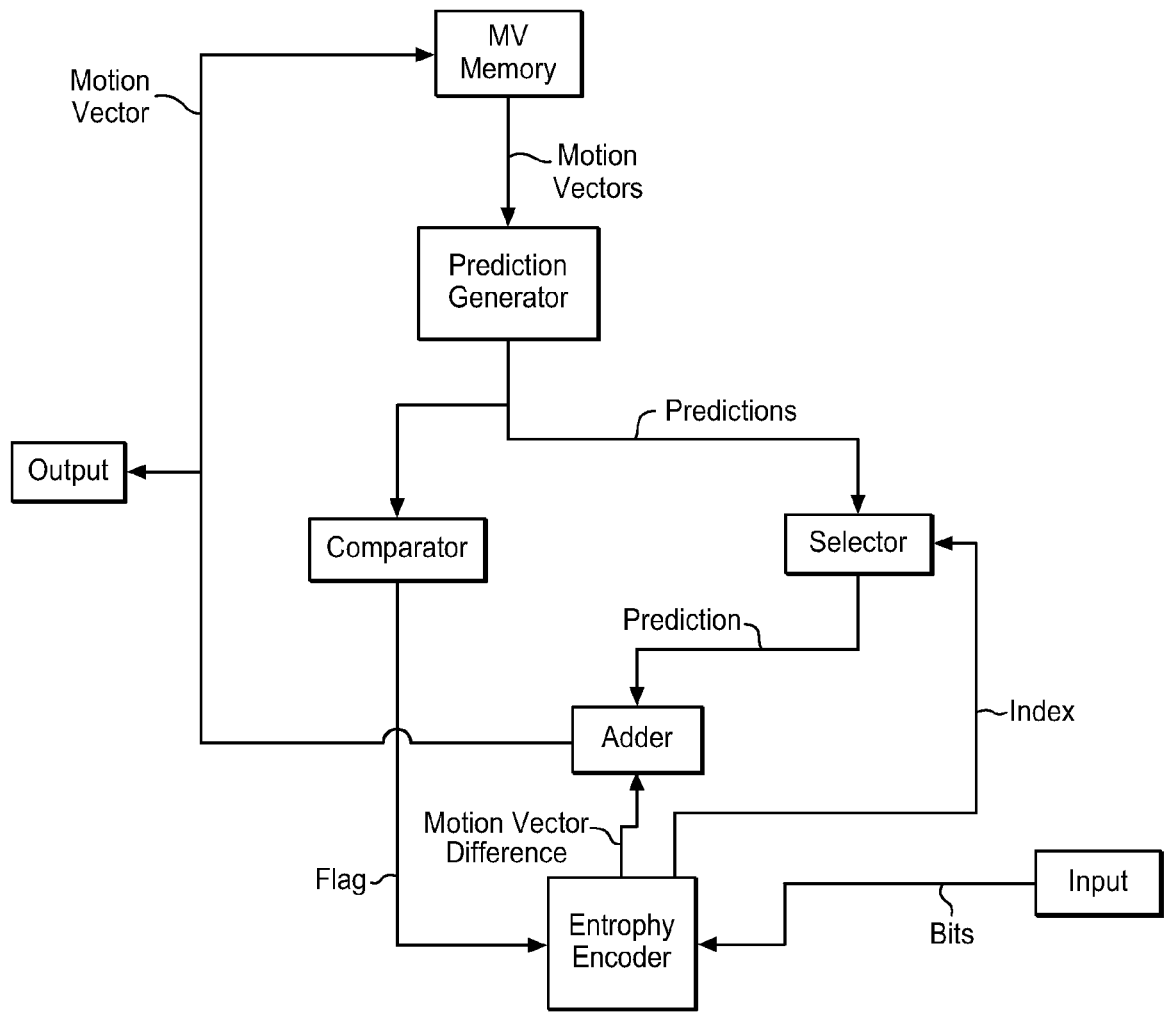
FIG. 9 is a block diagram of an alternative embodiment of a decoder.
Figure 10:
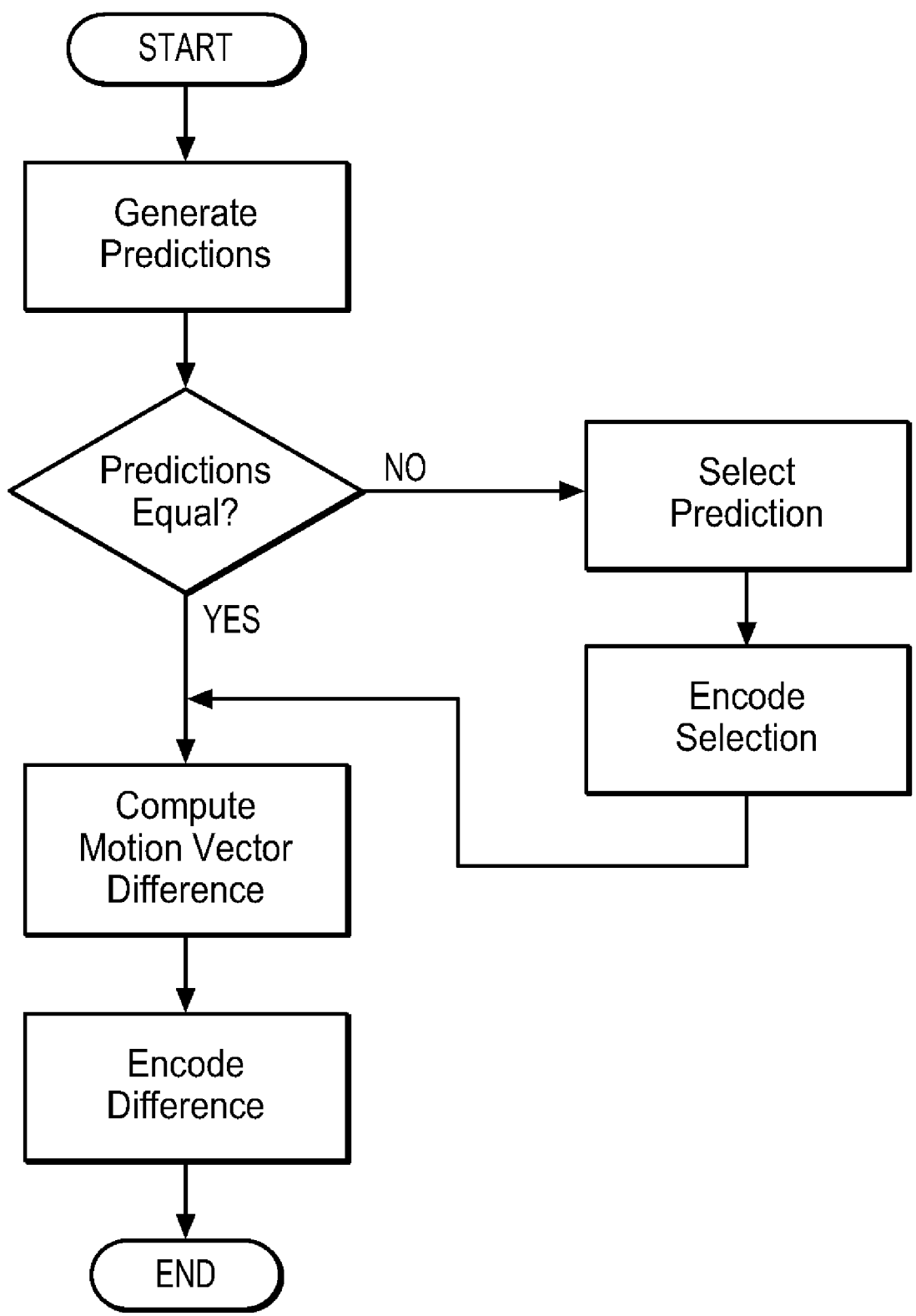
FIG. 10 is a flow diagram of an alternative embodiment of an encoding process.
Figure 11:
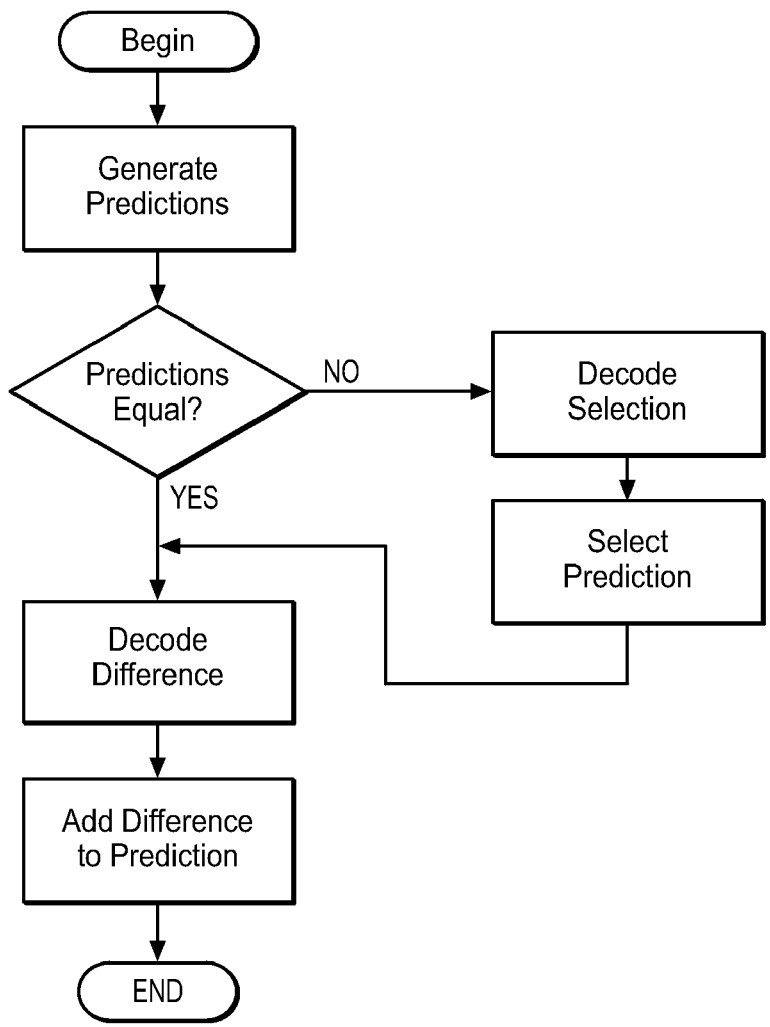
FIG. 11 is a flow diagram of an alternative embodiment of a decoding process.

In one embodiment, a separate context model is not used. An exemplary encoder is shown in FIG. 8, an exemplary decoder is shown in FIG. 9, an exemplary encoding process is shown in FIG. 10, and an exemplary decoding process is shown in FIG. 11. Note that blocks named similarly to those in FIGS. 1-4 operate in the same manner.

An Exemplary Prediction Generator

Figure 15:
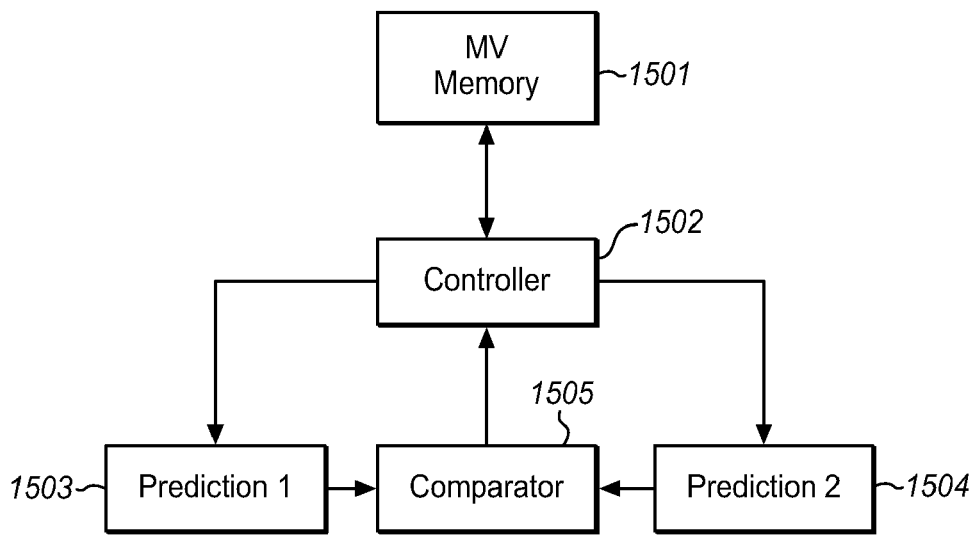
FIG. 15 is a block diagram of one embodiment of a prediction generator.

FIG. 15 is a block diagram of one embodiment of a prediction generator. Referring to FIG. 15, controller 1502 initially generates a first prediction 1503 and a second prediction 1504 by accessing motion vector memory 1501. Comparator 1505 compares prediction 1503 with prediction 1504 and informs controller 1502 of the result. If both predictions are equal and a stop condition is not satisfied, controller 1502 updates one of the predictions according to predetermined rules. One example of such rules is described below.

Figure 14:
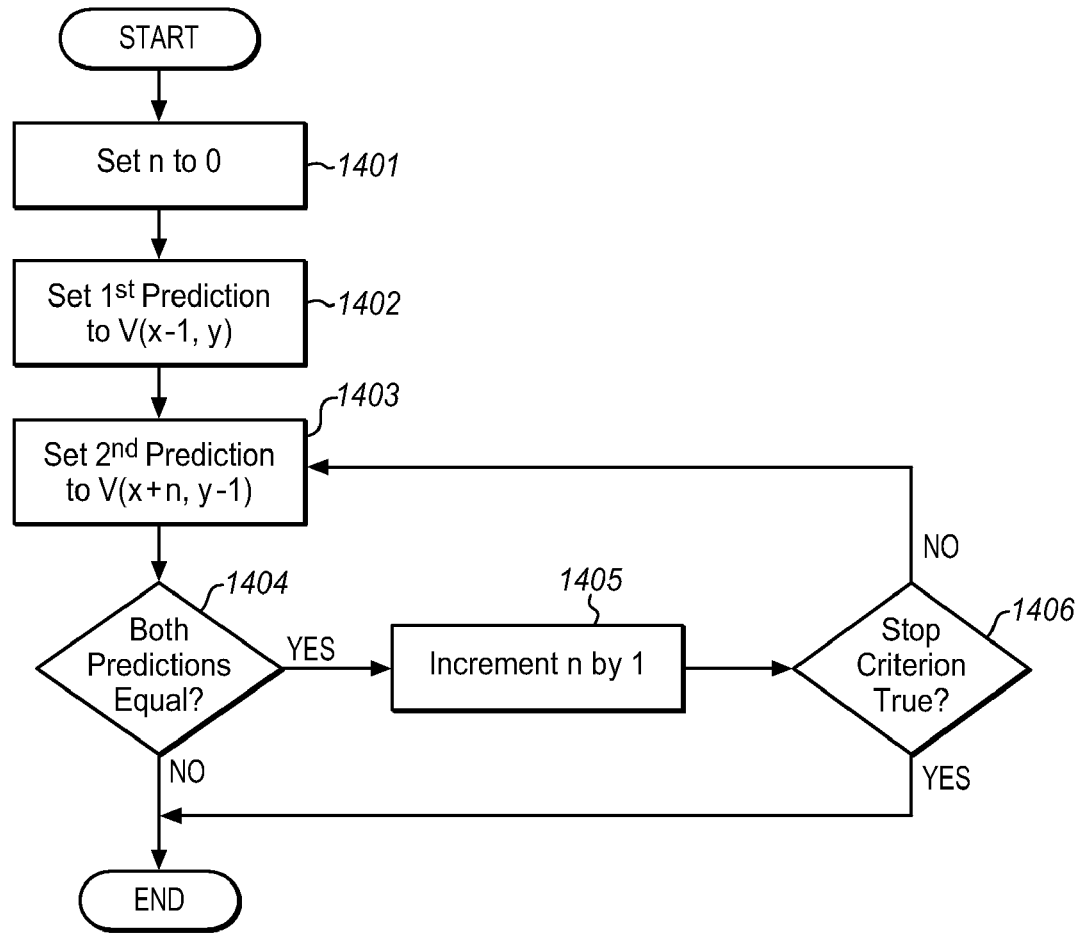
FIG. 14 is a flow diagram of one embodiment of a prediction generation process performed by a prediction generator.

FIG. 14 is a flow diagram of one embodiment of a prediction generator performed by a prediction generator, such as, for example, the prediction generator of FIG. 15. The process is performed by processing logic that may comprise hardware (circuitry, dedicated logic, etc.), software (such as is run on a general purpose computer system or a dedicated machine), or a combination of both.

Referring to FIG. 14, to generate predictions for a motion vector located at position (x,y), processing logic sets a variable n initially to zero (processing block 1401). Processing logic generates a first prediction by the motion vector located at position (x−1,y) (processing block 1403) and a second prediction by the motion vector located at position (x+n,y−1) (processing block 1403).

Processing logic comprises a first prediction and a second prediction (processing block 1404). If they are different, the prediction generation process ends. Otherwise, processing logic increments n by 1 (processing block 1405). Processing logic then checks to see if the stop condition has been satisfied (processing block 1406). If a stop condition is satisfied, the generation process ends. Otherwise, processing logic updates a second prediction (i.e., regenerated using the generation rule above). In one embodiment a stop condition may include a condition such as n is larger or equal to a predetermined number, for example 1 or 2. Furthermore, a stop condition may include a condition such as "the position (x+n,y−1) lies outside the image boundary".

Figure 16:
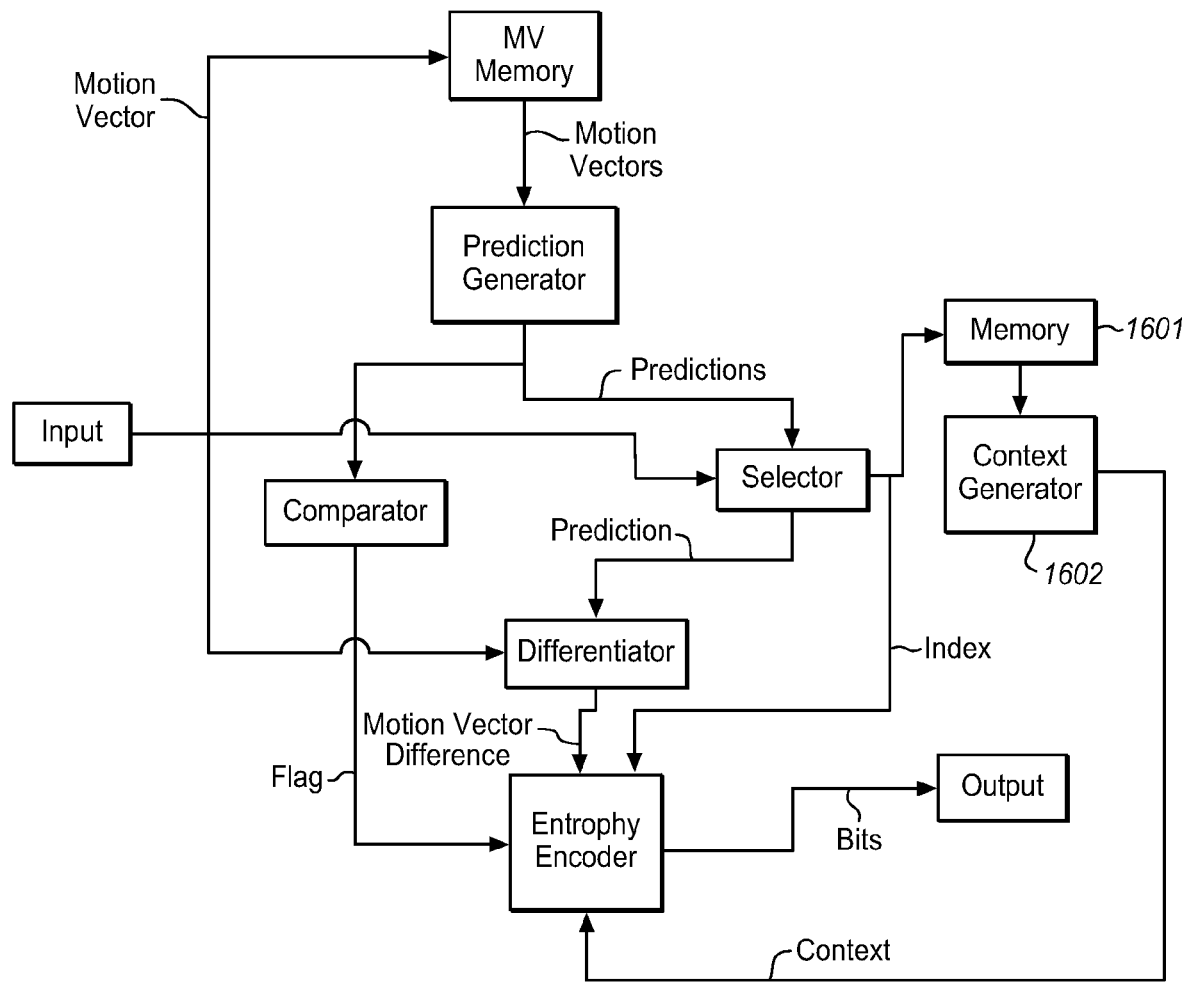
FIG. 16 is a block diagram of yet another alternative embodiment of an encoder.
Figure 17:
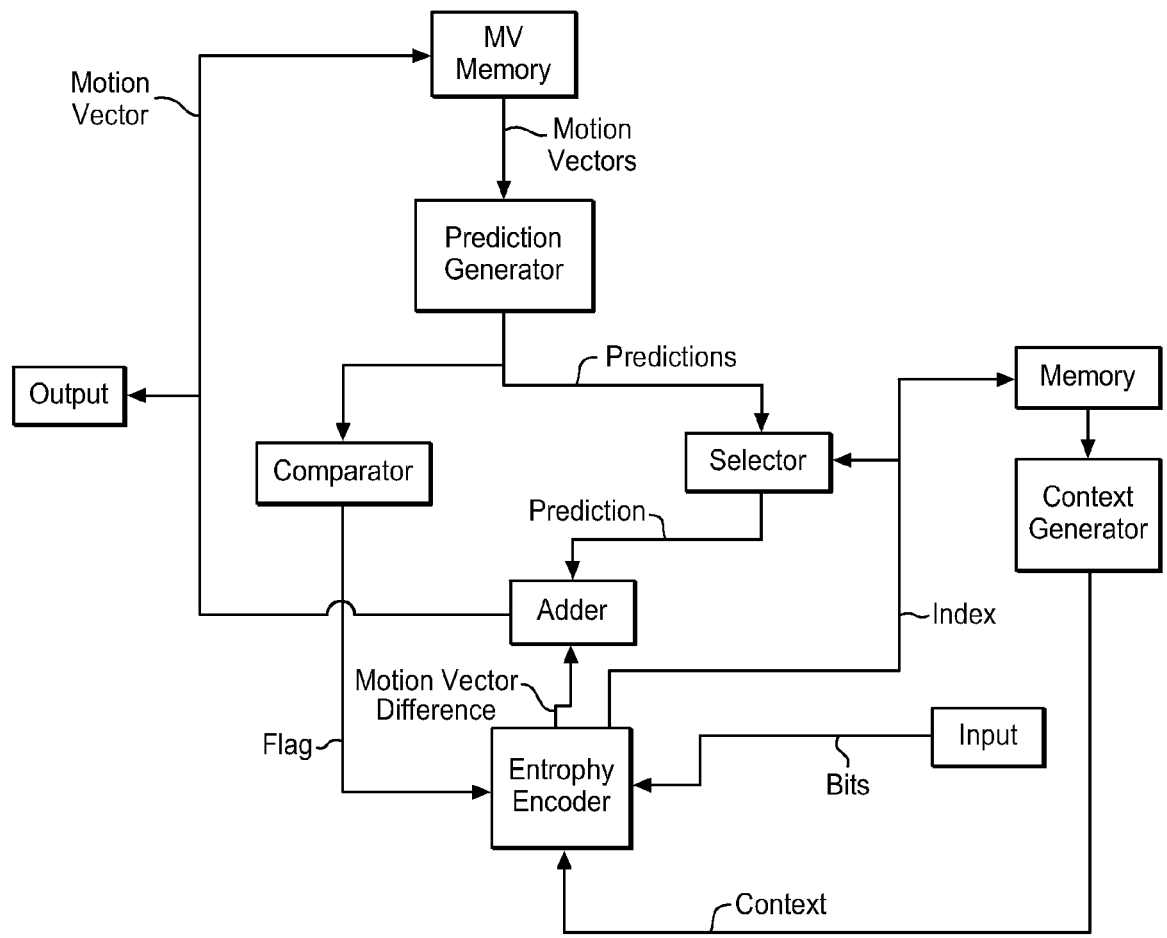
FIG. 17 is a block diagram of yet another alternative embodiment of a decoder

FIG. 16 is a block diagram of an alternative embodiment of an encoder in which the context generation operates using a memory other than the motion vector memory. Referring to FIG. 16, an encoder may contain a memory 1601 that stores values of an index generated by a selector, and a context generator 1602. Context generator 1602 reads values from memory 1601 and generates a context that is used by an entropy encoder, when using arithmetic coding, for example. A context may be constructed by considering the values of the index for previous blocks, for example blocks A, B, and B' in FIG. 5, 6 or 12. The entropy encoder may allocate bits for coding a value of an index as a function of the value of the context. For example, when using an arithmetic encoder, separate probability estimates for coding the value of the index may be kept for each value of the context. FIG. 17 describes a corresponding decoder.

An Exemplary Computer System

Figure 13:
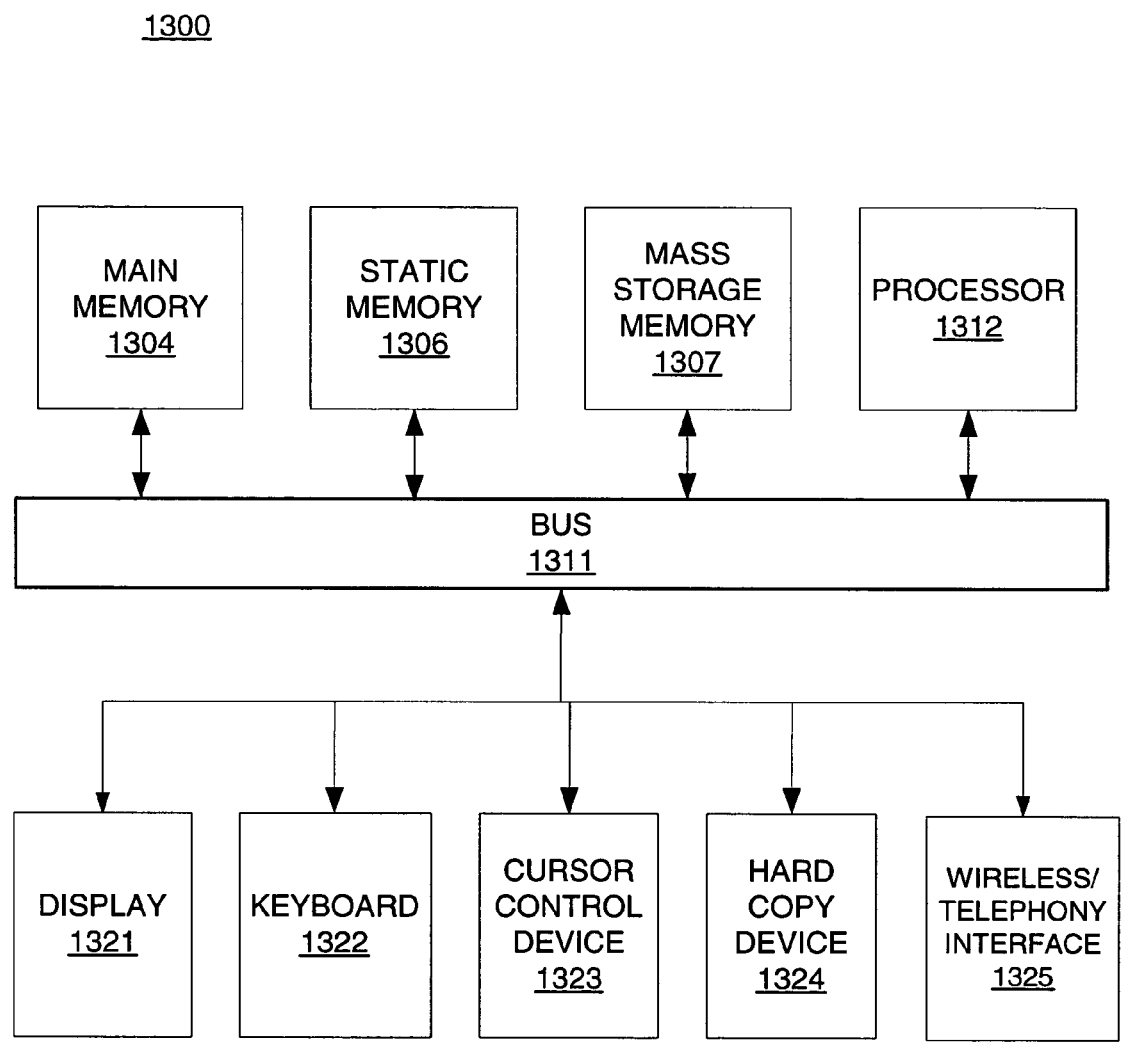
FIG. 13 illustrates a block diagram of an exemplary computer system.

FIG. 13 is a block diagram of an exemplary computer system that may perform one or more of the operations described herein. Referring to FIG. 13, computer system 1300 may comprise an exemplary client or server computer system. Computer system 1300 comprises a communication mechanism or bus 1311 for communicating information, and a processor 1312 coupled with bus 1311 for processing information. Processor 1312 includes a microprocessor, but is not limited to a microprocessor, such as, for example, Pentium™, etc.

System 1300 further comprises a random access memory (RAM), or other dynamic storage device 1304 (referred to as main memory) coupled to bus 1311 for storing information and instructions to be executed by processor 1312. Main memory 1304 also may be used for storing temporary variables or other intermediate information during execution of instructions by processor 1312.

Computer system 1300 also comprises a read only memory (ROM) and/or other static storage device 1306 coupled to bus 1311 for storing static information and instructions for processor 1312, and a data storage device 1307, such as a magnetic disk or optical disk and its corresponding disk drive. Data storage device 1307 is coupled to bus 1311 for storing information and instructions.

Computer system 1300 may further be coupled to a display device 1321, such as a cathode ray tube (CRT) or liquid crystal display (LCD), coupled to bus 1311 for displaying information to a computer user. An alphanumeric input device 1322, including alphanumeric and other keys, may also be coupled to bus 1311 for communicating information and command selections to processor 1312. An additional user input device is cursor control 1323, such as a mouse, trackball, trackpad, stylus, or cursor direction keys, coupled to bus 1311 for communicating direction information and command selections to processor 1312, and for controlling cursor movement on display 1321.

Another device that may be coupled to bus 1311 is hard copy device 1324, which may be used for printing instructions, data, or other information on a medium such as paper, film, or similar types of media. Furthermore, a sound recording and playback device, such as a speaker and/or microphone may optionally be coupled to bus 1311 for audio interfacing with computer system 1300. Another device that may be coupled to bus 1311 is a wired/wireless communication capability 1325 to communication to a phone or handheld palm device.

Note that any or all of the components of system 1300 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that in themselves recite only those features regarded as essential to the invention.

I claim:

1. A method for coding a data element, the method comprising:
   computing, by a prediction generator of an encoder, a plurality of predictions from a first plurality of previously coded data elements;
   computing, by a context generator of the encoder, a context based on a second plurality of previously coded data elements;
   selecting, by a prediction selector of the encoder, one of the plurality of predictions to obtain a selected prediction;
   encoding, by an entropy encoder of the encoder, an indication of the selected prediction with an entropy encoding model determined based on a value of the context; and
   encoding, by the entropy encoder of the encoder, a data element difference between the selected prediction and the data element.

2. The method defined in claim 1 wherein the data element comprises a motion vector.

3. The method defined in claim 1 wherein the plurality of predictions comprises two predictions.

4. The method defined in claim 3 wherein the two predictions comprises a first prediction that is equal to a data element associated with a first block located on a first side of a block associated with the data element being coded and a second prediction that is equal to a data element associated with a block located on a second side of the block associated with the data element being coded.

5. The method defined in claim 4 wherein the data element is a motion vector.

6. The method defined in claim 4 wherein the first and second sides comprise above and to the left, respectively, of the block containing the data element being coded.

7. The method defined in claim 1 wherein the plurality of predictions is three or more predictions, and wherein the three or more predictions comprises a first prediction that is equal to a data element associated with a first block located on a first side of a block associated with the data element being coded, a second prediction that is equal to a data element associated with a block located on a second side of the block associated the data element being coded, and one or more additional predictions that are equal to data elements associated with blocks located in proximity to the first block.

8. The method defined in claim 1 wherein the first plurality of previously coded data elements is not equal to the second plurality of previously coded data elements.

9. The method defined in claim 1 wherein the context is based on data elements associated with neighboring blocks.

10. The method defined in claim 9 wherein the neighboring blocks include a first block located above a block associated with the data element being coded, a second block located to the left of the block associated the data element being coded, and a third block located above the second block.

11. The method defined in claim 1 wherein encoding the data element difference between the selected prediction and the data element comprises subtracting the selected prediction from the data element.

12. The method defined in claim 1 wherein encoding the indication of the selected prediction occurs if the plurality of predictions are not equal to each other.

13. The method defined in claim 1 wherein encoding the indication of the selected prediction and encoding the data element difference are performed using an arithmetic encoder.

14. An encoder for outputting zero or more bits in response to an input of a data element, the encoder comprising:
    a prediction generator to generate a plurality of predictions from a first plurality of previously coded data elements;
    a context generator to compute a context based on a second plurality of previously coded data elements;
    a prediction selector to select one of the plurality of predictions to obtain a selected prediction;
    a prediction comparator to compare the plurality of predictions;
    a differentiator to compute a data element difference between the selected prediction and the data element; and
    an entropy encoder to encode an indication of the selected prediction with an encoding model determined based on a value of the context and to encode the data element difference.

15. The encoder defined in claim 14 wherein the data element comprises a motion vector.

16. The encoder defined in claim 14 wherein the plurality of predictions comprises two predictions.

17. The encoder defined in claim 16 wherein the two predictions comprises a first prediction that is equal to a data element associated with a first block located on a first side of a block associated with the data element being coded and a second prediction that is equal to a data element associated with a block located on a second side of the block associated with the data element being coded.

18. The encoder defined in claim 17 wherein the data element is a motion vector.

19. The encoder defined in claim 17 wherein the first and second sides comprise above and to the left, respectively, of the block containing the data element being coded.

20. The encoder defined in claim 14 wherein the plurality of predictions is three or more predictions, and wherein the three or more predictions comprises a first prediction that is equal to a data element associated with a first block located on a first side of a block associated with the data element being coded, a second prediction that is equal to a data element associated with a block located on a second side of the block associated the data element being coded, and one or more additional predictions that are equal to data elements associated with blocks located in proximity to the first block.

21. The encoder defined in claim 14 wherein the first plurality of previously coded data elements is not equal to the second plurality of previously coded data elements.

22. The encoder defined in claim 14 wherein the context is based on data elements associated with neighboring blocks.

23. The encoder defined in claim 22 wherein the neighboring blocks include a first block located above a block associated with the data element being coded, a second block located to the left of the block associated the data element being coded, and a third block located above the second block.

24. The encoder defined in claim 14 wherein the differentiator generates the data element difference by subtracting the selected prediction from the data element.

25. The encoder defined in claim 14 wherein the entropy encoder encodes the indication of the selected prediction only if the plurality of predictions are not equal to each other.

26. The encoder defined in claim 14 wherein entropy encoder comprises an arithmetic encoder.

27. An article of manufacture comprising a computer readable storage medium having instructions thereon which, when executed by a machine, cause the machine to perform a operations comprising:
    computing a plurality of predictions from a first plurality of previously coded data elements;
    computing a context based on a second plurality of previously coded data elements;
    selecting one of the plurality of predictions to obtain a selected prediction;
    encoding an indication of the selected prediction with an encoding model determined based on a value of the context; and
    encoding a data element difference between the selected prediction and the data element.

28. An apparatus comprising:
    means for computing a plurality of predictions from a first plurality of previously coded data elements;
    means for computing a context based on a second plurality of previously coded data elements;
    means for selecting one of the plurality of predictions to obtain a selected prediction;
    means for encoding an indication of the selected prediction with an encoding model determined based on a value of the context; and
    means for encoding a data element difference between the selected prediction and the data element.

29. A method for decoding a data element, the method comprising:
    computing, by a prediction generator of a decoder, a plurality of predictions from a first plurality of previously decoded data elements;
    computing, by a context generator of the decoder, a context based on a second plurality of previously decoded data elements;
    decoding, by an entropy decoder of the decoder, an indication of a selected prediction with an encoding model determined based on a value of the context;
    selecting, by a prediction selector of the decoder, the selected prediction from the plurality of predictions based on the decoded indication;
    decoding, by the entropy decoder of the decoder, a data element difference; and
    adding, by an adder of the decoder, the data element difference to the selected prediction to obtain the data element.

30. The method defined in claim 29 further comprising:
    comparing the plurality of predictions, wherein decoding the indication of the selected prediction occurs if the plurality of predictions are not equal to each other.

31. The method defined in claim 29 wherein the data element comprises a motion vector.

32. The method defined in claim 29 wherein the plurality of predictions comprises two predictions.

33. The method defined in claim 32 wherein the two predictions comprises a first prediction that is equal to a data element associated with a first block located on a first side of a block associated with the data element being decoded and a second prediction that is equal to a data element associated with a block located on a second side of the block associated with the data element being decoded.

34. The method defined in claim 33 wherein the data element is a motion vector.

35. The method defined in claim 33 wherein the first and second sides comprise above and to the left, respectively, of the block containing the data element being decoded.

36. The method defined in claim 29 wherein the plurality of predictions is three or more predictions, and wherein the three or more predictions comprises a first prediction that is equal to a data element associated with a first block located on a first side of a block associated with the data element being coded, a second prediction that is equal to a data element associated with a block located on a second side of the block associated with the data element being coded, and one or more additional predictions that are equal to data elements associated with blocks located in proximity to the first block.

37. The method defined in claim 29 wherein the first plurality of previously decoded data elements is not equal to the second plurality of previously decoded data elements.

38. The method defined in claim 29 wherein the context is based on data elements associated with neighboring blocks.

39. The method defined in claim 38 wherein the neighboring blocks include a first block located above a block associated with the data element being coded, a second block located to the left of the block associated the data element being coded, and a third block located above the second block.

40. The method defined in claim 29 wherein decoding the indication of the selected prediction and decoding a data element difference are performed using an arithmetic decoder.

41. A decoder to output a data element in response to an input of zero or more bits representing a data element, the decoder comprising:
a prediction generator to compute a plurality of predictions from a first plurality of previously decoded data elements;
a context generator to compute a context based on a second plurality of previously decoded data elements;
an entropy decoder to decode an indication of a selected prediction with an encoding model determined based on a value of the context and to decode a data element difference;
a prediction selector to select the selected prediction, from the plurality of predictions, based on the decoded indication;
an adder to add the data element difference to the selected prediction to obtain the data element.

42. The decoder defined in claim 41 further comprising:
a comparator to compare the plurality of predictions, wherein the entropy decoder decodes the indication of the selected prediction if the comparator indicates that the plurality of predictions are not equal to each other.

43. The decoder defined in claim 41 wherein the data element comprises a motion vector.

44. The decoder defined in claim 41 wherein the plurality of predictions comprises two predictions.

45. The decoder defined in claim 44 wherein the two predictions comprises a first prediction that is equal to a data element associated with a first block located on a first side of a block associated with the data element being decoded and a second prediction that is equal to a data element associated with a block located on a second side of the block associated with the data element being decoded.

46. The decoder defined in claim 45 wherein the data element is a motion vector.

47. The decoder defined in claim 45 wherein the first and second sides comprise above and to the left, respectively, of the block containing the data element being decoded.

48. The decoder defined in claim 41 wherein the plurality of predictions is three or more predictions, and wherein the three or more predictions comprises a first prediction that is equal to a data element associated with a first block located on a first side of a block associated with the data element being coded, a second prediction that is equal to a data element associated with a block located on a second side of the block associated with the data element being coded, and one or more additional predictions that are equal to data elements associated with blocks located in proximity to the first block.

49. The decoder defined in claim 41 wherein the first plurality of previously decoded data elements is not equal to the second plurality of previously decoded data elements.

50. The decoder defined in claim 41 wherein the context is based on data elements associated with neighboring blocks.

51. The decoder defined in claim 50 wherein the neighboring blocks include a first block located above a block associated with the data element being coded, a second block located to the left of the block associated the data element being coded, and a third block located above the second block.

52. The decoder defined in claim 41 wherein the entropy decoder comprises an arithmetic decoder.

53. An article of manufacture comprising a computer readable storage medium having instructions thereon which, when executed by a machine, cause the machine to perform a operations comprising:
computing a plurality of predictions from a first plurality of previously decoded data elements;
computing a context based on a second plurality of previously decoded data elements;
decoding an indication of a selected prediction with an encoding model determined based on a value of the context;
selecting the selected prediction, from the plurality of predictions based on the decoded indication;
decoding a data element difference; and
adding the data element difference to the selected prediction to obtain the data element.

54. An apparatus comprising:
means for computing a plurality of predictions from a first plurality of previously decoded data elements;
means for computing a context based on a second plurality of previously decoded data elements;
means for decoding an indication of a selected prediction with an encoding model determined based on a value of the context;
means for selecting the selected prediction, from the plurality of predictions based on the decoded indication;
means for decoding a data element difference; and
means for adding the data element difference to the selected prediction to obtain the data element.

55. The encoder of claim 15, wherein the prediction generator comprises:
a memory for storing a first prediction and a second prediction;
a comparator coupled to the memory to compare the first prediction and the second prediction; and a controller coupled to the comparator to update the second prediction while the first and second predictions are equal and a stop condition is not satisfied.

56. The method of claim 1, wherein the computing a plurality of predictions further comprises:

setting first and second predictions;
comparing the first and second predictions; and
updating the second prediction if the first and second predictions are equal and a stop condition is not satisfied.

\* \* \* \* \*